2

(12) United States Patent
Pasquero et al.

(10) Patent No.: US 8,869,263 B2
(45) Date of Patent: Oct. 21, 2014

(54) WIRELESS COMMUNICATIONS SYSTEM PROVIDING MOBILE DEVICE AUTHENTICATION BYPASS BASED UPON USER-WEARABLE SECURITY DEVICE AND RELATED METHODS

(75) Inventors: Jerome Pasquero, Kitchener (CA); David Ryan Walker, Waterloo (CA); Jason T. Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 525 days.

(21) Appl. No.: 12/713,574

(22) Filed: Feb. 26, 2010

(65) Prior Publication Data

US 2011/0214158 A1     Sep. 1, 2011

(51) Int. Cl.
  *G06F 21/00* (2013.01)
  *G06F 21/35* (2013.01)
  *H04B 5/00* (2006.01)
(52) U.S. Cl.
  CPC . *G06F 21/35* (2013.01); *H04B 5/00* (2013.01)
  USPC .......... 726/17; 726/2; 726/9; 380/247; 713/1; 713/182
(58) Field of Classification Search
  CPC ................................. H04B 5/00; G06F 21/35
  USPC .................. 380/247; 713/1, 182; 726/9, 17, 2
  See application file for complete search history.

(56) References Cited

U.S. PATENT DOCUMENTS

| 6,346,886 B1 | 2/2002 | De La Huerga | 340/573.1 |
| 6,695,207 B1 * | 2/2004 | Norris, Jr. | 235/382 |
| 7,257,374 B1 | 8/2007 | Creigh | 455/41.2 |
| 7,360,332 B2 | 4/2008 | Rozovsky | |

(Continued)

FOREIGN PATENT DOCUMENTS

| EP | 2048594 | 4/2009 | |
| WO | WO2006090899 | 8/2006 | ............... H04Q 7/38 |

OTHER PUBLICATIONS

NPL "Lightweight User Interfaces for Watch Based Displays" (2005) by Peter Hutterer et al.; 10 pages; originally downloaded from www.tinmith.net/papers/hutterer-auic-2005.pdf.*

(Continued)

*Primary Examiner* — Catherine Thiaw
*Assistant Examiner* — Don Zhao
(74) *Attorney, Agent, or Firm* — Allen, Dyer, Doppelt, Milbrath & Gilchrist, P.A.

(57) ABSTRACT

A wireless communications system may include a user-wearable device including a clasp having open and closed positions, a first wireless security circuit (WSC), and a first controller coupled to the clasp and the first WSC. The system may further include a mobile wireless communications device including a portable housing, an input device(s), a second WSC carried by the portable housing and configured to communicate with the first WSC when in close proximity therewith, and a second controller carried by the portable housing and coupled to the second WSC and the input device(s). The second controller may be configured to enable mobile wireless communications device(s) function based upon a manual entry of an authentication code via the input device(s), and bypass the manual entry and enable the mobile wireless communications device function(s) based upon a communication from the user-wearable device and a position of the clasp.

19 Claims, 6 Drawing Sheets

(56) References Cited

U.S. PATENT DOCUMENTS

| | | | |
|---|---|---|---|
| 7,571,468 B1* | 8/2009 | Williams | 726/9 |
| 2004/0139348 A1 | 7/2004 | Norris, Jr. | |
| 2007/0262134 A1 | 11/2007 | Humphrey et al. | 235/379 |
| 2008/0222711 A1 | 9/2008 | Michaelis | 726/7 |
| 2008/0235144 A1 | 9/2008 | Phillips | 705/67 |
| 2008/0273684 A1 | 11/2008 | Profanchik | 379/207.02 |
| 2009/0192935 A1* | 7/2009 | Griffin et al. | 705/41 |
| 2009/0249478 A1 | 10/2009 | Rosener et al. | 726/19 |
| 2010/0304670 A1* | 12/2010 | Shuo | 455/41.1 |

OTHER PUBLICATIONS http://www.ensuretech.com/products/overview/overview.html: printed Oct. 3, 2013.

Goodwin, Antuan "Transponder watch makes DBS owners feel like James Bond" http://reviews.cnet.com/8301-13746_7-10022346-48.html?tag=mncol;title Aug. 21, 2008. pp. 1-2.

"RIM Announces Next Generation BlackBerry Smart Card Raader" http://press.rim.com/release.jsp?id=2490: printed Sep. 23, 2013: pp. 1-2.

* cited by examiner

WIRELESS COMMUNICATIONS SYSTEM PROVIDING MOBILE DEVICE AUTHENTICATION BYPASS BASED UPON USER-WEARABLE SECURITY DEVICE AND RELATED METHODS

TECHNICAL FIELD

This application relates to the field of communications, and more particularly, to mobile wireless communications devices and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or Near Field Communication (NFC) chips. NFC technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

With NFC technology becoming more commonplace, it is now used with portable wireless communications devices in association with other short-range wireless communications, such as a wireless Bluetooth connection. For example, an NFC connection is often used to establish a wireless Bluetooth connection in which data for establishing the Bluetooth connection is communicated.

Despite the advantages of such approaches, further techniques for utilizing near field communication technologies for mobile wireless devices may be desirable in some applications.

DETAILED DESCRIPTION

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a wireless communications system is disclosed herein which may include a user-wearable device including a clasp having open and closed positions, a first wireless security circuit, and a first controller coupled to the clasp and the first wireless security circuit. The system may further include a mobile wireless communications device including a portable housing, at least one input device, a second wireless security circuit carried by the portable housing and configured to communicate with the first wireless security circuit when in close proximity therewith, and a second controller carried by the portable housing and coupled to the second wireless security circuit and the at least one input device. The second controller may be configured to enable at least one mobile wireless communications device function based upon a manual entry of an authentication code via the at least one input device, and bypass the manual entry and enable the at least one mobile wireless communications device function based upon a communication from the user-wearable device and a position of the clasp. As such, the system may advantageously allow for ready access to the device function(s) without having to repeatedly provide the user authentication code, yet also prevent an unauthorized user from accessing the device function when apart from the user-wearable device or when the clasp is not in a designated position.

More particularly, the first and second controllers may be further configured to enter a paired state with one another authorizing communication therebetween. Furthermore, the second controller may be configured to not bypass the manual entry upon a first communication from the user-wearable device after the clasp has been moved from the open to the closed position. Moreover, the second controller may be further configured to bypass manual entry upon a second communication and each subsequent communication from the user-wearable device as long as the clasp remains in the closed position. Additionally, the second controller may be further configured to disable the at least one mobile wireless communications device function after one of a time-out period and time-out event.

By way of example, the first and second wireless security circuits may each comprise a near field communication (NFC) circuit. Further, the clasp may comprise first and second mating portions, and the user-wearable device may further include a wrist band carrying the first and second mating portions. In another embodiment, the user-wearable device may include a waist band having ends coupled to respective ones of the first and second mating portions. In still another embodiment, the clasp may include first and second gripping portions to grip to a user's garment, and the user-wearable device may include a token body coupled to the first and second gripping portions.

The wireless communications device may further include a cellular transceiver carried by the portable housing and coupled to the second controller. By way of example, the clasp may comprise an electrical switch. Additionally, the at least one input device may comprise a keypad, for example.

A mobile wireless communications device, such as the one described briefly above, is also provided. Moreover, a related wireless communications method is for a user-wearable device and a mobile wireless communications device, such as those described above. The method may include enabling at least one mobile wireless communications device function based upon a manual entry of an authentication code via the at least one input device, and bypassing the manual entry and enabling the at least one mobile wireless communications device function based upon a communication from the user-wearable device and a position of the clasp.

Figure 1:
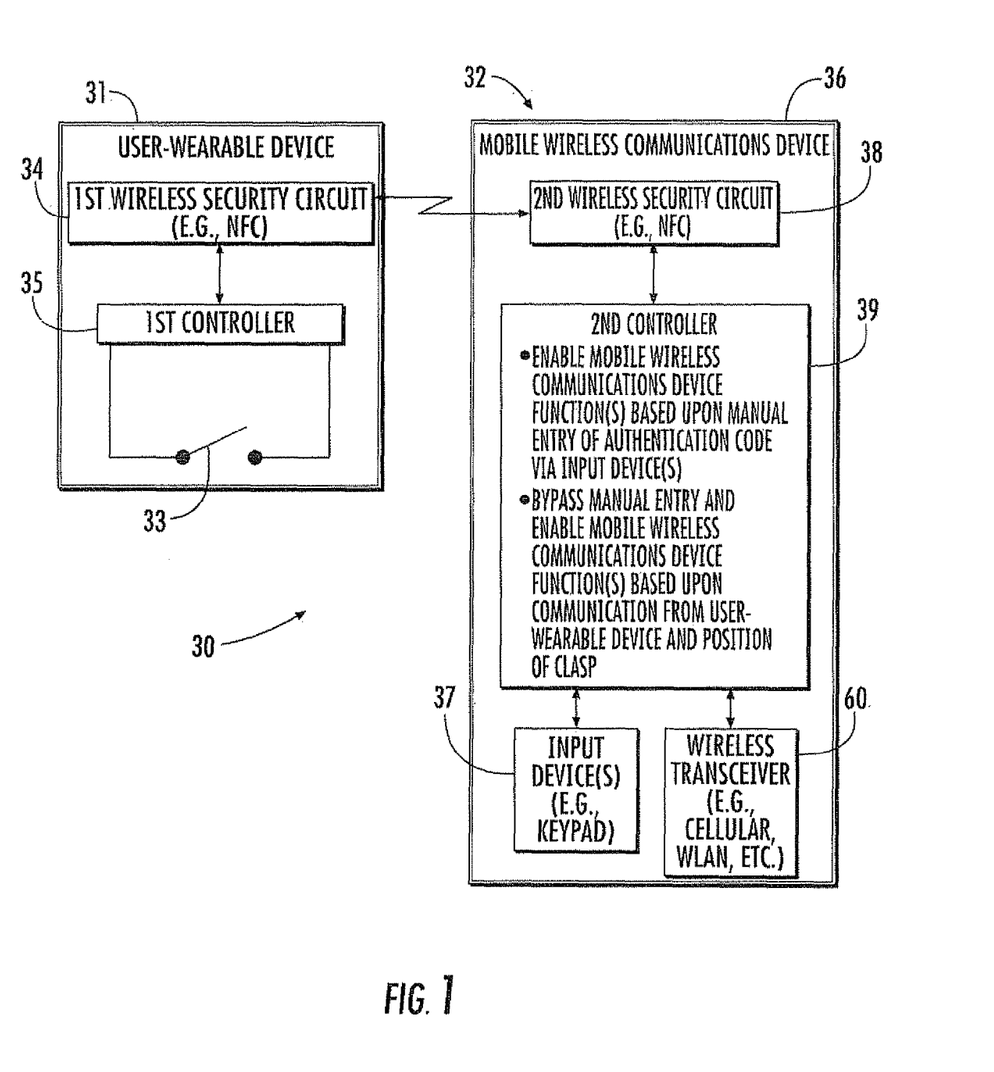
FIG. 1 is a schematic block diagram of a wireless communications system in accordance with one aspect.
Figure 2:
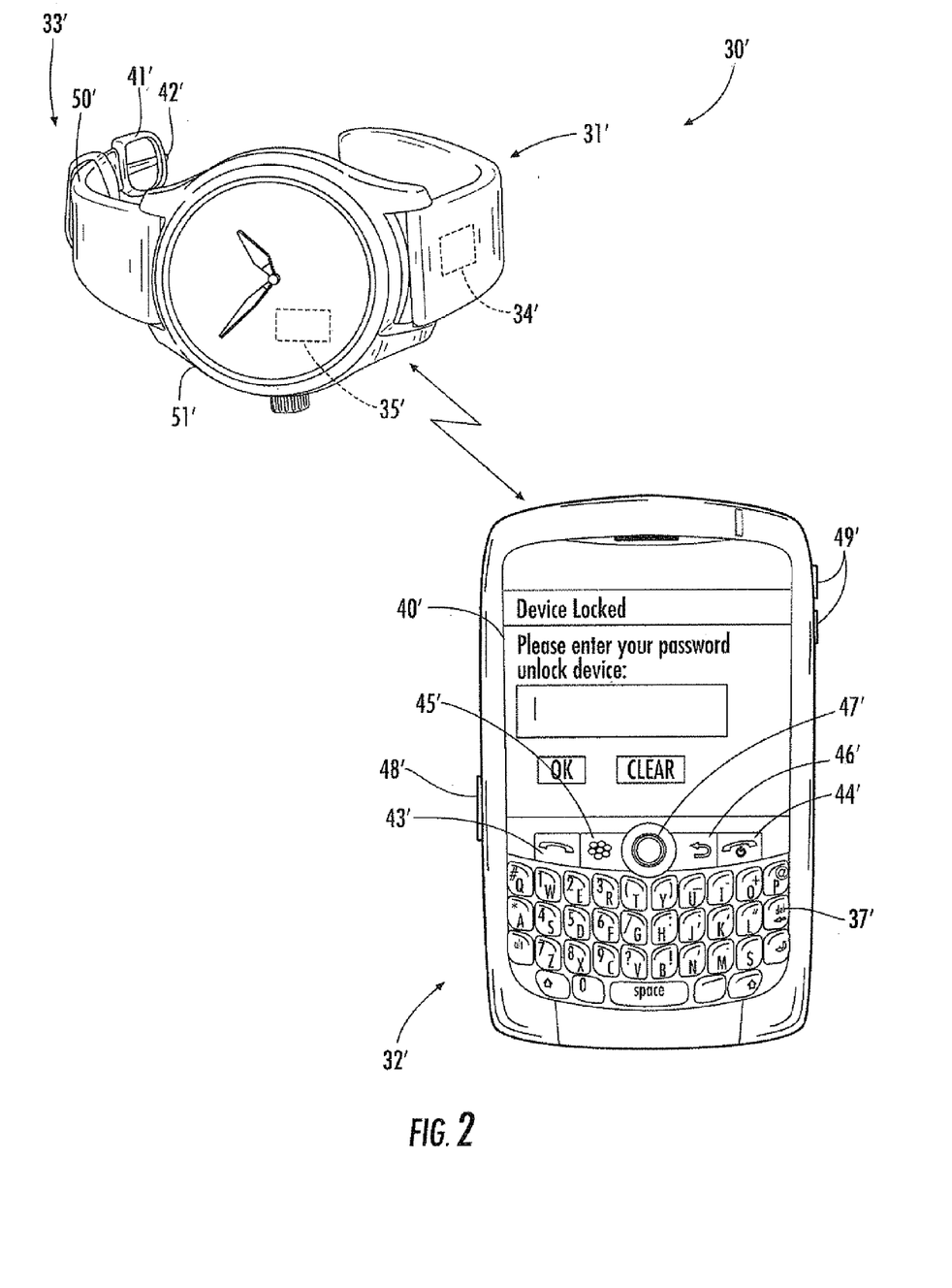
FIG. 2 is a schematic diagram of an embodiment of the system of FIG. 1 utilizing a user-wearable watch security device.

Referring initially to FIGS. 1 and 2, a wireless communications system 30 illustratively including a user-wearable device 31 and a mobile wireless communications device 32 (also referred to as a "mobile device" herein) is first described. By way of background, many mobile devices are configured to operate in an authentication or security mode, in which an authentication password or code is required to enable the device to perform functions such as sending messages (e.g., email, SMS, MMS, etc.), placing a phone call, navigating device menus (e.g., accessing the device memory, changing device settings, etc.), or running a device application (e.g., business, entertainment, finance, games, music/audio, video, maps/navigation, reference, shopping, sports/recreation, travel, utilities, weather, etc.). After a time-out period or event (e.g., a menu option to enter the security mode, auto off, etc.), the mobile device is disabled and a password is again required the next time access to a device function(s) is desired. Such device "locking" advantageously helps to prevent unauthorized access to mobile device functions in the event that the mobile device is lost or stolen.

While such a security mode is important in this regard, it may be cumbersome to repeatedly enter a password or code each time access to the mobile device is required, which may amount to dozens of times a day for corporate or high-frequency users. Moreover, it is generally recommended that passwords or codes be several characters long to enhance security and decrease the chance of the password being guessed, with mixed letter and number codes providing the greatest security. However, the use of long and complicated passwords or codes only leads to greater frustration when they have to be entered on such a frequent basis. This may be particularly so on some mobile devices that have relatively small keys or touch screens, which may increase the difficulty of entering the characters.

Generally speaking, the wireless communications system 30 advantageously provides the security of a mobile device security or password protect mode while also reducing the number of times an authorization or pass code has to be provided to enable the mobile device. In particular, the user-wearable device 31 includes a clasp 33 (which is illustrated as an electrical switch in FIGS. 1 and 2) having open and closed positions. The user-wearable device 31 further illustratively includes a first wireless security circuit 34 (also referred to as a "first security circuit" herein), and a first controller 35 coupled to the clasp and the first wireless security circuit.

The mobile device 32 illustratively includes a portable housing 36, one or more input devices 37, and a second wireless security circuit 38 (also referred to as a "second security circuit" herein) carried by the portable housing and configured to communicate with the first wireless security circuit 34 when in close proximity therewith. By way of example, the first and second wireless security circuits 34, 38 may be near field communication (NFC) circuits which communicate using NFC communications. However, other suitable communications formats may also be used in different embodiments. Various input devices 37 may be used, such as a keypad, track ball, scroll wheel, touch screen, touch pad, buttons, etc.

The mobile device 32 also illustratively includes a second controller 39 carried by the portable housing 36 and coupled to the second wireless security circuit 38 and the input device 37. By way of example, the second controller 39 may be implemented by a microprocessor (and associated memory) of the mobile device 32 executing computer-readable instructions. Generally speaking, the second controller 39 is configured to enable one or more mobile device functions, such as those noted above, based upon manual entry of an authentication code (e.g., an alphanumeric password or code) via the input device 37. Moreover, the second controller 39 is further configured to bypass manual entry of the authentication code and enable the mobile device function(s) based upon a communication from the user-wearable device and a position of the clasp. In the present example, the mobile device 32 also illustratively includes a wireless transceiver 60, such as a cellular or wireless LAN transceiver, for example. However, the wireless transceiver 60 need not be included in all embodiments of the mobile device 32 (e.g., a music player (MP3, etc.), a digital wallet with private contact information, etc.).

The foregoing will now be further described with reference to FIGS. 2 through 5. In the embodiment illustrated in FIG. 2, the user-wearable device 31' is a watch in which the clasp 33' illustratively includes first and second mating portions 41', 42', and a wrist band 50' coupled to the first and second mating portions. In accordance with the exemplary implementation, the first and second mating portions 41', 42' of the clasp 33' define an electrical switch. Closing of the clasp 33' (i.e., inserting the second mating portion 42' through a hole in the wrist band 50' and into contact with the first mating portion 41') forms a closed circuit, and opening the clasp opens the circuit. It should be noted that other clasp configurations may be used, such as a magnetic (e.g., Hall effect) sensor or mechanical interlocking arrangement, etc. Moreover, it should also be noted that in some embodiments, the first and second mating portions 41', 42' need not be carried on the same end of the wrist band 50' (i.e., they are on opposing ends that buckle or otherwise connect together). This is true of the belt configuration that will be described below with respect to FIG. 3 as well.

Furthermore, a time piece 51' is also carried by the wrist band 50', and one or both of the first wireless security circuit 34' and the first controller 35' may be housed within the time piece. Alternatively, one or both of the first wireless security circuit 34' and the first controller 35' may be housed in the wrist band 50'. In the illustrated embodiment, the first wireless circuit 34' is housed in the wrist band 50', and the first controller 35' is housed in the time piece 51'.

Figure 5:
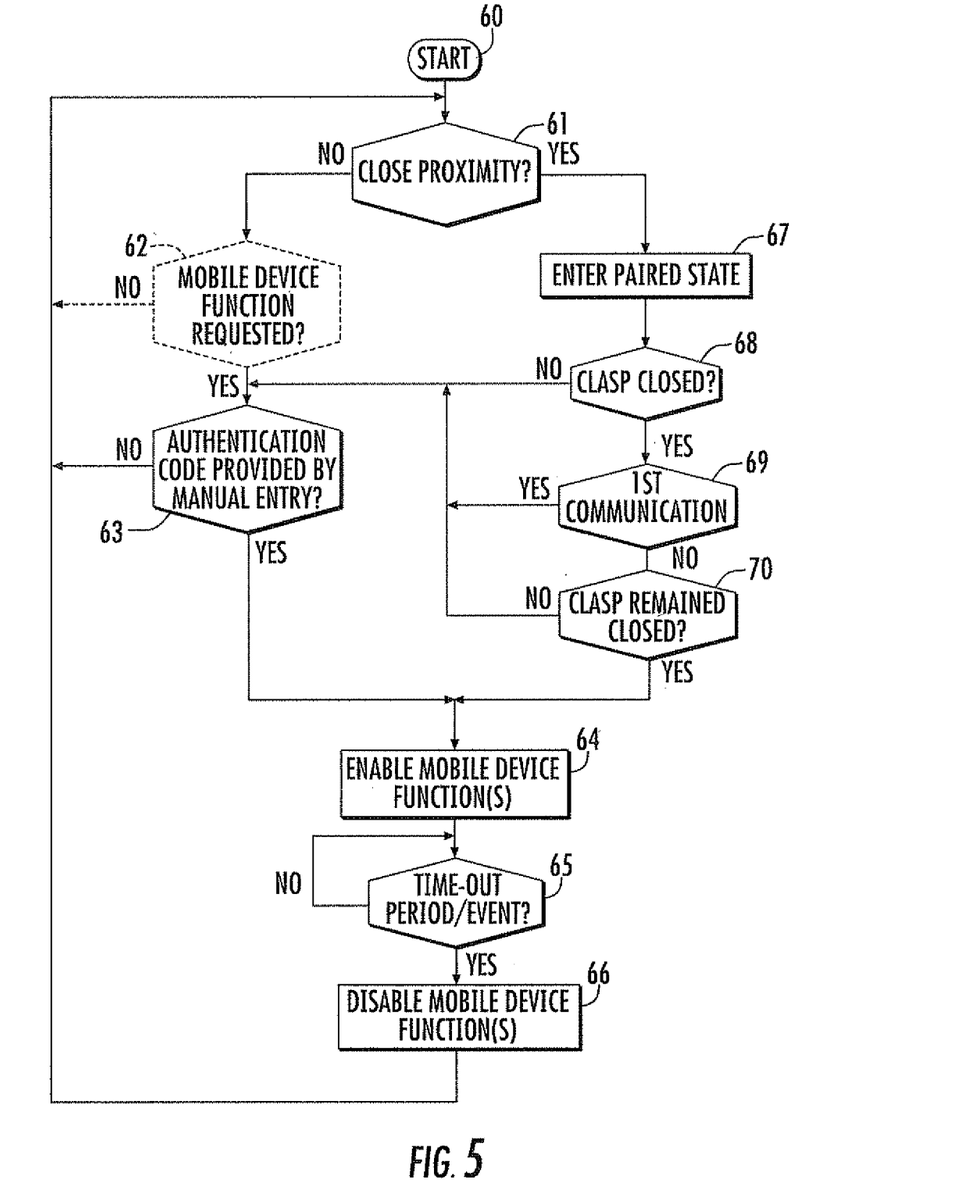
FIG. 5 is a flow diagram illustrating wireless communications method aspects in accordance with an embodiment.

Beginning at Block 60, a determination as to whether the mobile device 32' is in close proximity with the user-wearable device 31' is made. For example, this may be when the first and second wireless security circuit 34' and the second wireless security circuit (not shown in FIG. 2) are in range and begin communicating with one another, at Block 61. In the context of NFC communications, one of the first end wireless security circuit 34' and the second wireless security circuit may operate in a passive (e.g., NFC tag) mode, while the other operates in an active (e.g., NFC reader) mode. For example, the first security circuit 34' may operate in a passive mode to save watch battery power, and the second wireless security circuit 38' may operate in an active mode, since mobile device batteries are typically recharged on a frequent basis and battery drain may not be as important of a consideration. Even so, mobile device battery drain from NFC operation may be a consideration in some embodiments, and an NFC power saving mode may be used accordingly. It should also be noted that other NFC operational modes, such as peer-to-peer operation, may also be used.

Figure 3:
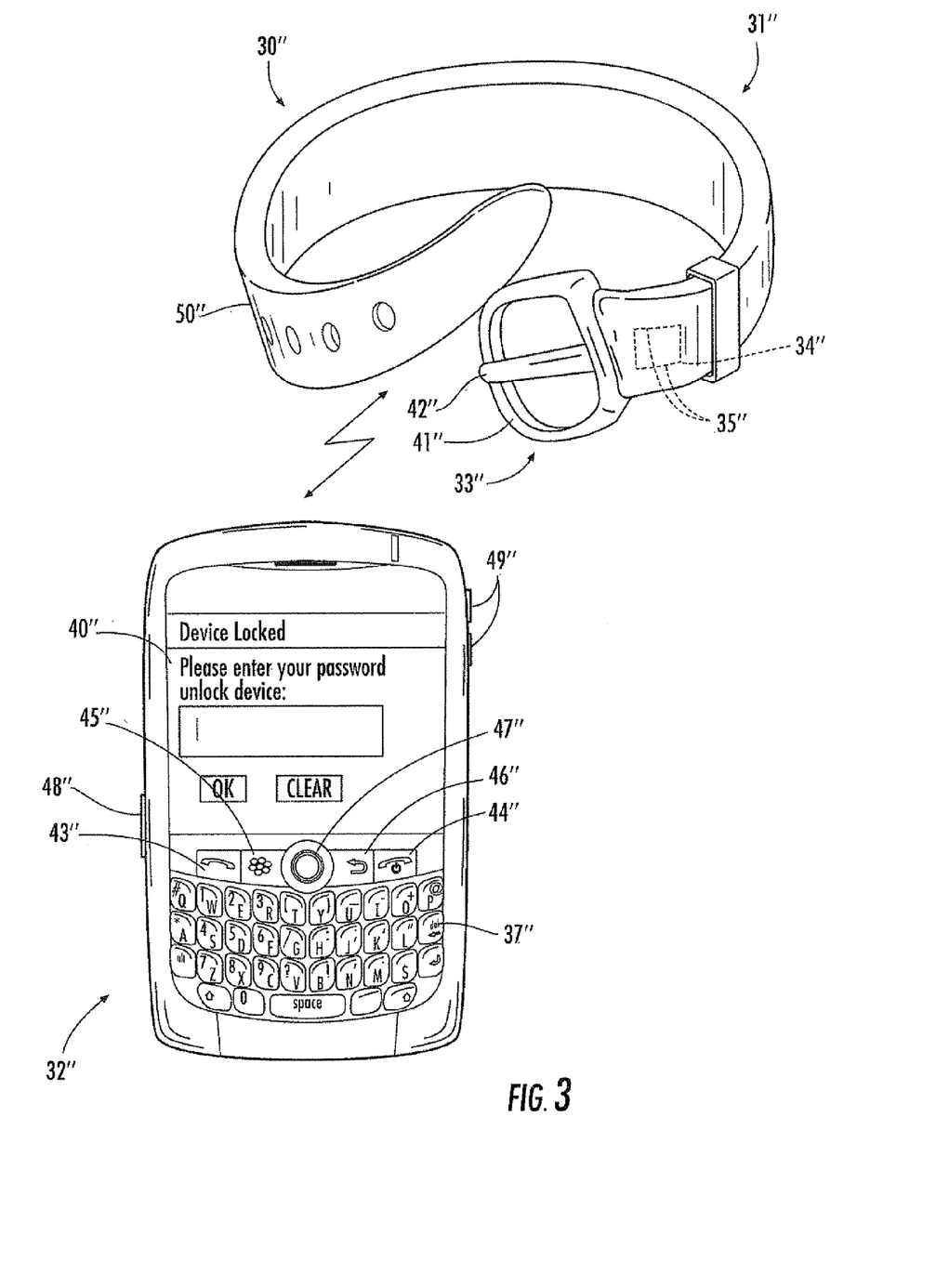
FIG. 3 is a schematic diagram of another embodiment of the system of FIG. 1 utilizing a user-wearable belt security device.

In some embodiments, such as in the example illustrated in FIG. 2, bringing the mobile device 32' and user-wearable device 31' in close proximity is considered as a request to enable a mobile device function(s). That is, moving the mobile device 32' and the user-wearable device 31' next to one another causes the mobile device to "wake up" and generate an authentication code prompt on a display 40', as seen in FIG. 3.

However, a request to enable the mobile device function(s) may also be made when the mobile device 32' and user-wearable device 31' are not in close proximity, at Block 63. For example, a user may be carrying the mobile device 32', but not the user-wearable device 31'. In such case, access to a mobile device function may be requested in different ways. For example, when the mobile device 32' is powered on, the second controller 39' may initially place the mobile device in the password protected or security (i.e., disabled) mode and prompt for the authentication code before enabling mobile device functions. In other words, turning the mobile device 32' on (whether manually or automatically based upon an auto on/off feature) may be considered a request to access mobile device functions.

In another embodiment, the input device 37' (here a keypad) provides an input, such as through pressing of one of the keys on the keypad, which initiates the authentication prompt. Similarly, other buttons or keys may also indicate to the second controller 39' that a device function is being requested, such as an "off hook" phone button 43', an "on hook" phone button 44', a menu button 45', a back or escape button 46', a track ball 47' or other similar input device (e.g., touch screen, touch pad, scroll wheel, etc.), a convenience key 48', or a volume key 49'.

In some embodiments, a combination of close proximity between the mobile device 32' and the user-wearable device 31' plus input from the input device(s) 37', may be required to initiate communications between the first and second wireless security circuits 34', 38' and request access to a mobile device function. This may be desirable, for example, in the case where the mobile device 32' is carried in a relatively close position to the user-wearable device 31' (e.g., on a waistband holder, in a pocket, etc.), where the two would repeatedly or continuously be in close proximity when access to a mobile function(s) was not required.

When access to a device function(s) is requested, if the user-wearable device 31' and mobile device 32' are not in close proximity, the second controller (not shown in FIG. 2) checks to see if the proper authentication code is manually entered or provided, at Block 63, at which point one or more (or all) mobile device functions are enabled, at Block 64. Otherwise (i.e., a proper authentication code is not provided), the mobile device function(s) remains disabled. Upon the occurrence of a time-out period or event (Block 65), as discussed above, the mobile device function(s) is again disabled, at Block 66.

When the user-wearable device 31' and mobile device 32' are in close proximity and a mobile device function has been requested (i.e., by bringing them into close proximity, pressing a button/key, etc., as noted above), the second controller 39 communicates with the first controller 35 via the first and second wireless security circuits 34, 38 to enter a paired state, at Block 67. Next, a determination is made as to whether the clasp 33' is in the closed position, at Block 68. By way of example, the first controller 35 may comprise state machine circuitry that monitors which state (i.e., position) the clasp 33' is in, and whether there has been a change in this state.

If the clasp 33' is not closed, then the second controller 39 proceeds to the authentication step discussed above at Block 63. If the clasp 33' remains open (e.g., the user-wearable device 31' is not donned by the user), or the mobile device 32' is not within close proximity of the user-wearable device, then the authentication code would be required each subsequent time a mobile device function is requested (i.e., just like a normal password protect or security mode would operate, as discussed above).

On the other hand, if the clasp 33' is closed when the mobile device function(s) is requested, then it is determined whether this is a first or initial communication between the user-wearable device 31' and the mobile device 32', at Block 69. That is, it is determined whether this is the first time that the user-wearable device 31' and the mobile device 32' have communicated since the clasp 33' was closed. If so, then the authentication code is still required to enable the mobile device function(s) (Block 63), as similarly described above. In other words, the second controller 39' is configured to not bypass the manual entry upon a first communication from the user-wearable device 31' after the clasp 33' has been moved from the open to the closed position.

However, if this is a second or subsequent communication between the user-wearable device 31' and the mobile device 32' since the clasp 33' was closed and the proper authentication code was previously provided, and the clasp has remained closed (Block 70), then the mobile device function(s) is enabled without requiring manual entry of the authentication code. That is, manual entry of the authentication code is advantageously bypassed, allowing the mobile device function to be initiated simply by bringing the user-wearable device 31' and the mobile device 32' into close proximity with one another. In some embodiments, this may be achieved by tapping the mobile device 32' against the user-wearable device 31'. However, if the clasp 33' has been opened since the first communication, then manual entry of the authentication code would be requested, as described above.

This approach provides for expedited access to mobile device functions without the need for repeated entry of an authentication code (i.e., so long as the clasp 33' remains closed). Furthermore, it advantageously helps prevent unauthorized access to the device functions in the event the mobile device 32' is lost or stolen. That is, if the mobile device 32' is not in close proximity to the user-wearable device 31', the mobile device functions will not be authorized without the proper authentication code. Moreover, even if the user-wearable device 31' and mobile device 32' were lost or stolen together, opening of the clasp 33' would cause the mobile device to revert back to the standard password entry mode, requiring an authentication password or code to be entered, and thereby protect against unauthorized access to the mobile device functions and data. That is, the user-wearable device 31' cannot be removed without opening the clasp 33' (aside from cutting). However, wiring to the clasp 33' may extend through the wrist band 50' and be considered as part of the clasp so that, if severed, this would also cause an open circuit condition, and thus disable the authentication code bypass.

Figure 4:
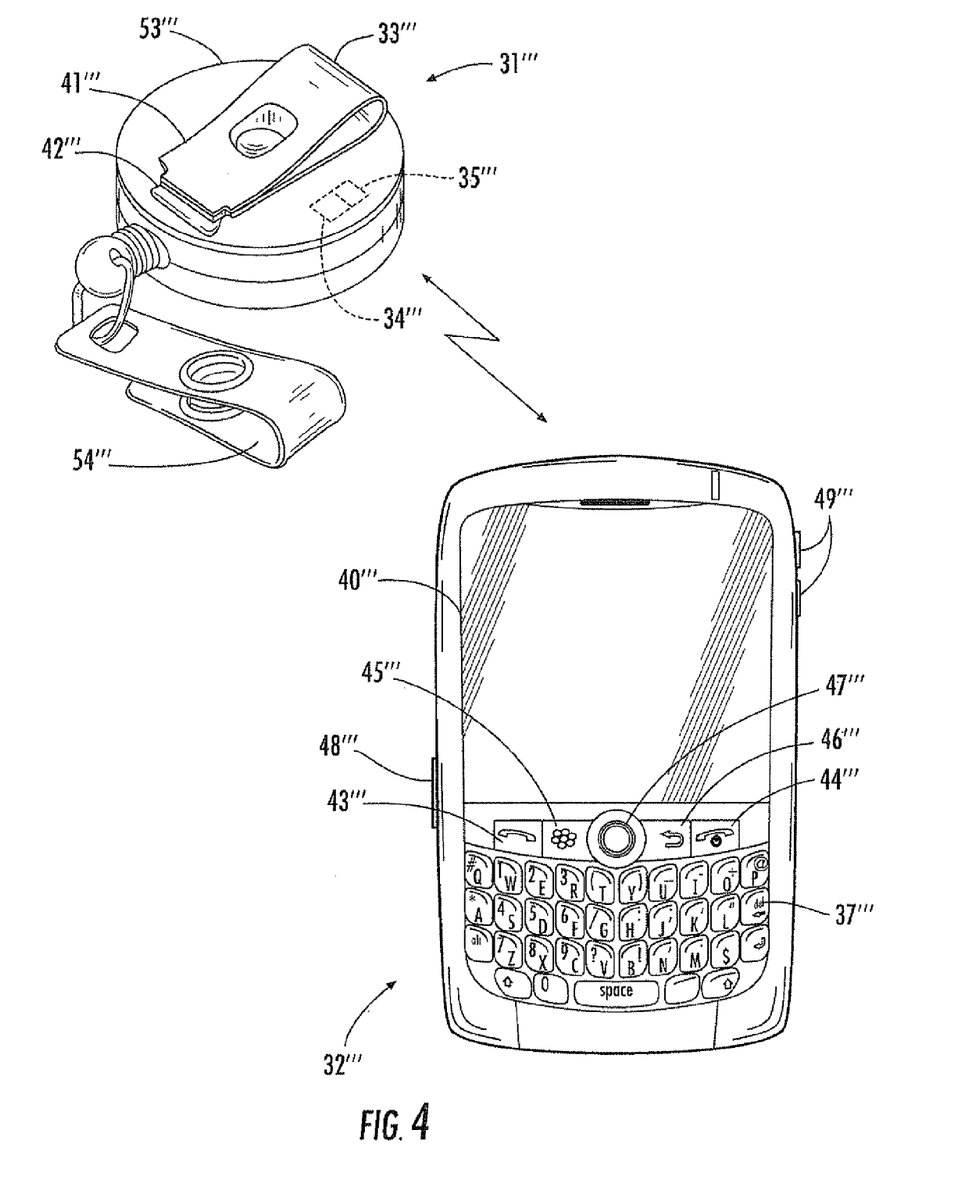
FIG. 4 is a schematic diagram of still another embodiment of the system of FIG. 1 utilizing a user-wearable identification (ID) holder device.

Another advantageous embodiment is shown in FIG. 3, in which the user-wearable device 31" is a belt, i.e., to be worn around a user's waist. In other embodiments the user-wearable device may be implemented as a piece of jewelry, such as a bracelet or necklace, for example. Still another advantageous embodiment is shown in FIG. 4, in which the user-wearable device 31''' is an identification (ID) card reel, and the clasp 33''' takes the form of a clip including first and second gripping portions 41''', 42''' to grip to a user's garment carried on a reel 53'''. A holder 54''' for a token body (e.g., an ID or security card) is connected to the reel 53'''. It should be noted that the reel 53''' need not be used in all embodiments, i.e., the clasp 33''' could be directly coupled to the holder 54''' (or directly to an ID or token) in some implementations. Circuit contacts, magnets, etc., may be used to detect when the first and second gripping portions 41", 42" are in the open or closed position. Other embodiments of user-wearable devices may include: a button on an article of clothing (e.g., shirts, pants); a tie; shoes; shoelaces, etc. Generally speaking, items that can be in one of two physical states (e.g., on/off, buttoned/unbuttoned, tied/untied, fastened/unfastened, etc.) which the user cannot part with or remove without switching the state may be suitable user-wearable devices.

Exemplary components of a mobile wireless communications device 1000 that may be used in accordance with an exemplary embodiment are further described below with reference to FIG. 6. The device 1000 illustratively includes a housing 1200, a keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
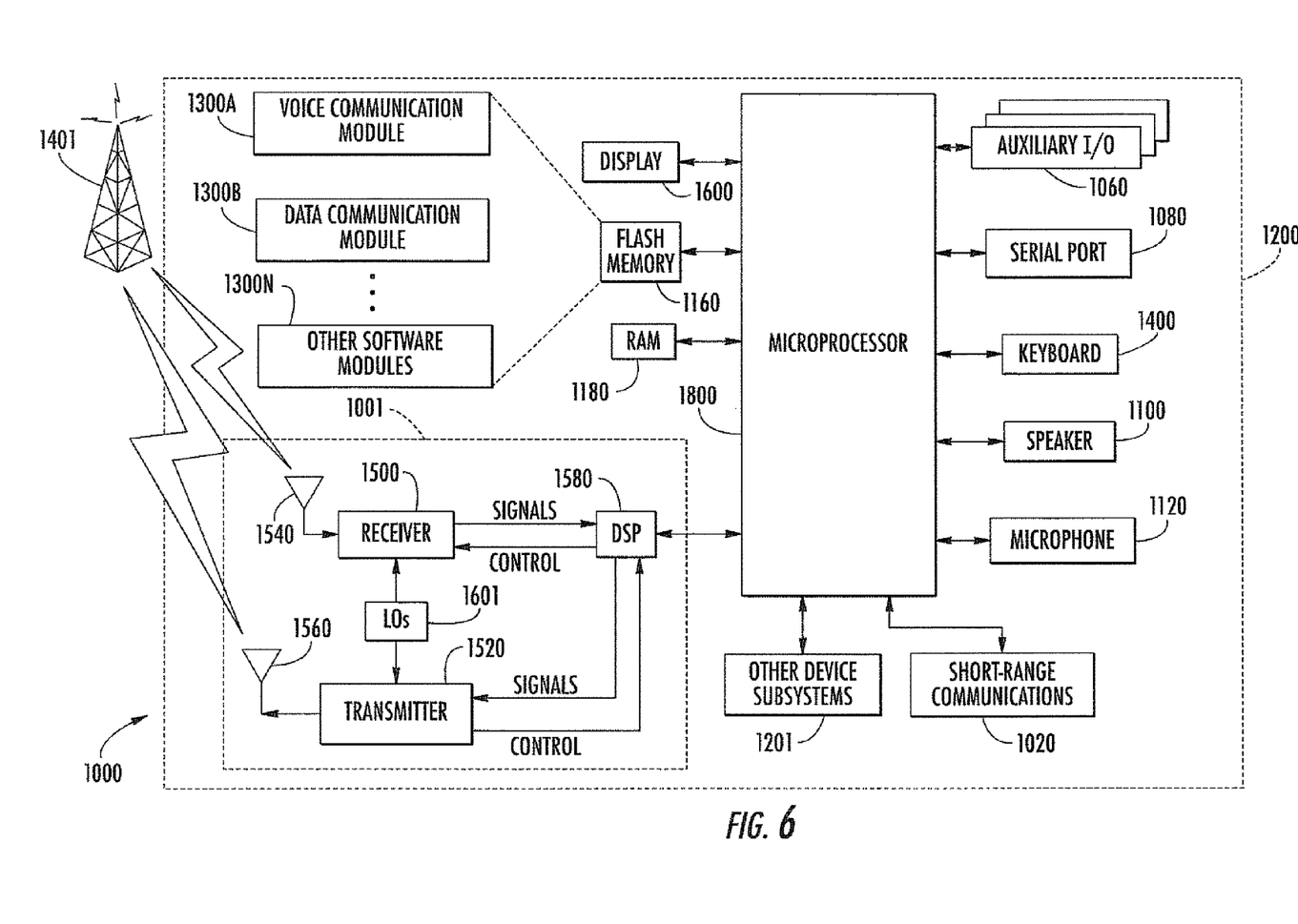
FIG. 6 is a schematic block diagram illustrating exemplary components of a mobile wireless communications device that may be used with the system of FIG. 1.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as voice and data communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT or General Packet Radio Service (GPRS) mobile data communications networks, and also designed to operate with any of a variety of voice communications networks, such as AMPS, TDMA, COMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A wireless communications system comprising:
a user-wearable device comprising
a clasp having an open position and a closed position,
a first wireless security circuit, and
a first controller coupled to said clasp and said first wireless security circuit; and
a mobile wireless communications device comprising
a portable housing,
at least one input device,
a second wireless security circuit carried by said portable housing and configured to communicate with said first wireless security circuit at a distance of ten centimeters or less, and
a second controller carried by said portable housing, coupled to said second wireless security circuit and said at least one input device and configured to
initiate communications between the first and second wireless security circuits based upon a combination of proximity between the first and second wireless security circuits of ten centimeters or less and a manual input from a user received via the at least one input device,
when communications between the first and second wireless security circuits have been initiated upon a first occurrence, enable at least one mobile wireless communications device function based upon a manual entry of an authentication code via said at least one input device, and
bypass the manual entry and enable the at least one mobile wireless communications device function upon subsequent occurrences of communications between the first and second wireless security circuits based upon a communication from said user-wearable device and
said clasp remaining in a designated position;
said first and second wireless security circuits each comprising a near field communication (NFC) circuit.

2. The wireless communications system of claim 1 wherein said first and second controllers are further configured to enter a paired state with one another authorizing communication therebetween.

3. The wireless communications system of claim 1 wherein said second controller is configured to not bypass the manual entry upon a first communication from said user-wearable device after said clasp has been changed from the open position to the closed position.

4. The wireless communications system of claim 3 wherein said second controller is further configured to bypass manual entry upon a second communication and each subsequent communication from said user-wearable device while said clasp remains in the closed position.

5. The wireless communications system of claim 1 wherein said second controller is further configured to disable the at least one mobile wireless communications device function after one of a time-out period and a time-out event.

6. The wireless communications system of claim 1 wherein said clasp comprises first and second mating portions; and wherein said user-wearable device further comprises a wrist band carrying the first and second mating portions.

7. The wireless communications system of claim 1 wherein said clasp comprises first and second mating portions; and wherein said user-wearable device further comprises a waist band having ends coupled to respective ones of the first and second mating portions.

8. The wireless communications system of claim 1 wherein said clasp comprises first and second gripping portions to grip to a user's garment; and wherein said user-wearable device comprises a token body coupled to the first and second gripping portions.

9. The wireless communications system of claim 1 wherein said wireless communications device further comprises a cellular transceiver carried by said portable housing and coupled to said second controller.

10. The wireless communications system of claim 1 wherein said clasp comprises an electrical switch.

11. The wireless communications system of claim 1 wherein said at least one input device comprises a keypad.

12. A mobile wireless communications device for use with a user-wearable device comprising a clasp having an open position and a closed position, a first wireless security circuit, and a first controller coupled to the clasp and the first wireless security circuit, the mobile wireless communications device comprising:
a portable housing;
at least one input device;
a second wireless security circuit carried by said portable housing and configured to communicate with the first wireless security circuit at a distance of ten centimeters or less, said first and second wireless security circuits each comprising a near field communication (NFC) circuit; and
a second controller carried by said portable housing, coupled to said second wireless security circuit and said at least one input device and configured to
initiate communications between the first and second wireless security circuits based upon a combination of proximity between the first and second wireless security circuits of ten centimeters or less and a manual input from a user received via the at least one input device,
when communications between the first and second wireless security circuits have been initiated upon a first occurrence, enable at least one mobile wireless communications device function based upon receipt of an authentication code entered via said at least one input device, and bypass entry of the authentication code and enable the at least one mobile wireless communications device function upon subsequent occurrences of communications between the first and second wireless security circuits based upon a communication from the user-wearable device and the clasp remaining in a designated position.

13. The mobile wireless communications device of claim 12 wherein the first controller and said second controller are further configured to enter a paired state with one another authorizing communication therebetween.

14. The mobile wireless communications device of claim 12 wherein said second controller is configured to not bypass the entry upon a first communication from the user-wearable device after the clasp has been moved from the open position to the closed position.

15. The mobile wireless communications device of claim 14 wherein said second controller is further configured to bypass the entry upon a second communication and each subsequent communication from the user-wearable device while the clasp remains in the closed position.

16. A method for using a mobile wireless communications device with a user-wearable device comprising a clasp having an open position and a closed position and a first wireless security circuit, the mobile wireless communications device comprising a portable housing, at least one input device, and a second wireless security circuit carried by the portable housing and configured to communicate with the first wireless security circuit at a distance of ten centimeters or less, the method comprising:

initiating communications between the first and second wireless security circuits based upon a combination of proximity between the first and second wireless security circuits of ten centimeters or less and a manual input from a user received via the at least one input device, when communications between the first and second wireless security circuits have been initiated upon a first occurrence, enabling at least one mobile wireless communications device function based upon receipt of an authentication code entered via the at least one input device; and bypassing entry of the authentication code and enabling the at least one mobile wireless communications device function upon subsequent occurrences of communications between the first and second wireless security circuits based upon a communication from the user-wearable device and the clasp remaining in a designated position;

wherein the first and second wireless security circuits each comprises a near field communication (NFC) circuit.

17. The method of claim 16 wherein bypassing further comprises not bypassing the entry upon a first communication from the user-wearable device after the clasp has been moved from the open position to the closed position.

18. The method of claim 17 wherein bypassing further comprises bypassing entry upon a second communication and each subsequent communication from the user-wearable device while the clasp remains in the closed position.

19. The method of claim 16 further comprising disabling the at least one mobile wireless communications device function after one of a time-out period and a time-out event.

* * * * *